Jan. 13, 1970     W. M. MAHER ET AL     3,489,937
MOTOR CONSTRUCTION
Filed Dec. 18, 1967
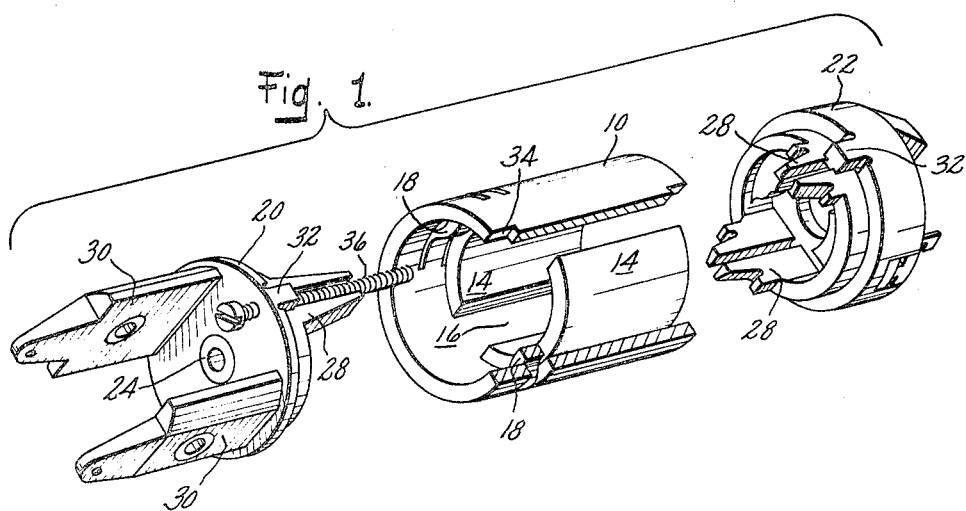
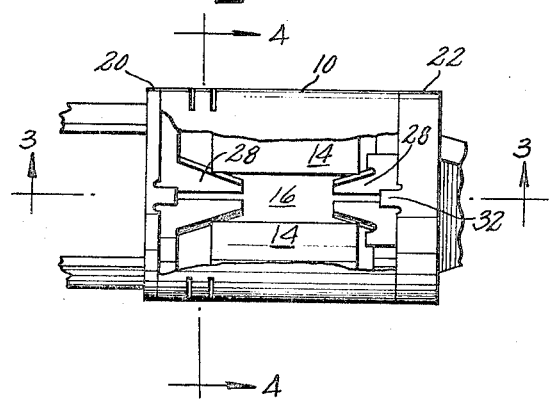
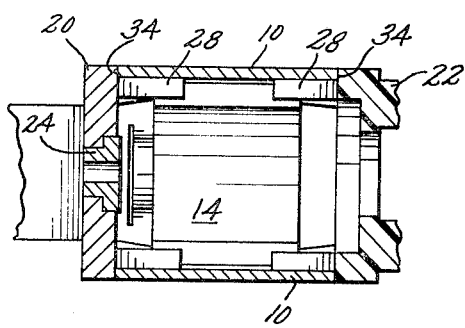
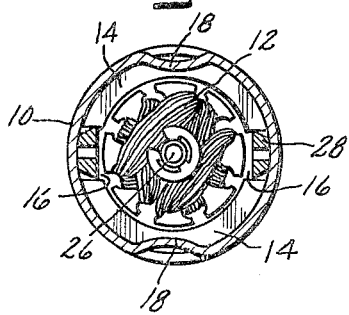
Inventors:
William M. Maher,
Duane M. Seaburg
by *John F. Cullen*
Attorney United States Patent Office 3,489,937
Patented Jan. 13, 1970

3,489,937
MOTOR CONSTRUCTION
William M. Maher, Churchville, and Duane M. Seaburg, Oakfield, N.Y., assignors to General Electric Company, a corporation of New York
Filed Dec. 18, 1967, Ser. No. 691,257
Int. Cl. H02k 21/28, 23/04
U.S. Cl. 310—154                               9 Claims

ABSTRACT OF THE DISCLOSURE

A permanent magnet motor construction and particularly the field structure of such a motor where the magnets are positioned and held by end caps to reduce parts and provide easy manufacture and inexpensive assembly of small fractional horsepower motors.

BACKGROUND OF THE INVENTION

Field of the invention

The use of ceramic permanent magnets has offered attractive features for use as pole pieces in electric motors and particularly in small fractional horsepower motors and has involved different means for mounting the magnets.

Description of the prior art

Presently known methods for securing such magnets in the thin motor field ring-like shell are by cementing the magnets to the field shell, using metal spring clips to wedge the magnets against the inside diameter of the field shell, and using various forms of wedging clips to hold the pole magnets in their assembled position within the field shell. The components, excepting the field ring and magnets themselves, are generally of non-magnetic materials.

The present invention is an improvement on the field structure of the types mentioned to reduce the number of parts and provide for easy assembly.

SUMMARY OF THE INVENTION

Briefly, the permanent magnet fractional horsepower motor uses a thin cylindrical magnetic field ring-like shell that carries a segmented armature for rotation about a longitudinal axis within the shell. Generally, a pair of cylindrical magnet segments are oppositely disposed on the inner surface of the field shell and are of such size to provide longitudinal gaps between their adjacent edges. Locating means, preferably in the form of a pair of oppositely disposed punched-in portions on the shell at one end, form stops to limit the longitudinal movement of each magnet in one direction. End caps are provided to support the armature shaft and each cap is formed with an axially extending wedge that nests within the field shell at each end. The wedge members engage between the magnet gaps forcing the magnets radially against the inner surface of the shell and holding them against longitudinal movement in the opposite direction from the stop means. Thus, single non-magnetic caps with wedge members thereon replace a number of parts and perform the same functions with fewer parts and simplify the assembly. The main object of the invention then is to provide a simplified fractional horsepower motor that uses fewer parts in its field structure to reduce costs and is easy and cheaper to assemble.

BRIEF DESCRIPTION OF THE DRAWING

FIG. 1 is an exploded perspective view of the improved field structure with parts broken away for clarification;

FIG. 2 is a partial broken view of the assembled form of the field structure;

FIG. 3 is a cross-sectional view on line 3—3 of FIG. 2; and

FIG. 4 is a sectional view on line 4—4 of FIG. 2 showing an armature in place.

DESCRIPTION OF PREFERRED EMBODIMENT

Referring first to FIG. 1, there are shown the main components of the field structure of a permanent magnet fractional horsepower motor for use in small appliances or the like. However, the structure is applicable to any size but will be described with reference to a small fractional horsepower motor. In such a motor, a thin cylindrical magnet field shell 10 of suitable length and thickness is designed to hold an inner segmented armature 12 as shown in FIG. 4 for rotation in the conventional manner. The field structure of the motor uses plural magnets 14 that are formed as a pair of cylindrical or semi-tubular segments preferably oppositely disposed around the armature on the inner shell periphery as shown in FIG. 1. The magnets may be known ceramic permanent magnets or their equivalent.

The magnets are formed to provide longitudinal gaps 16 between their adjacent edges of any desired width. In order to position the magnets longitudinally, stop means are provided on the shell substantially at one end to extend inwardly thereof and such means can conveniently take the form of oppositely disposed punched-in portions 18 that abut each of the magnet ends and limit their movement to the left as shown in FIG. 1.

In order to provide support for rotation of armature 12, a pair of non-magnetic end caps 20 and 22 is provided. These may incorporate central bearings such as bearing 24 or its equivalent to support shaft 26 of the armature for rotation about a longitudinal axis within the field structure.

To avoid separate wedge structures or spacers or clips, the end caps may have wedge members 28 preferably as a pair oppositely disposed and of the same or different size formed directly thereon and extending and tapered longitudinally from each cap as shown in FIG. 1. In order to use the wedges for locating the magnets, the end caps are formed with a stepped portion at the wedges so the wedges nest within the shell at each end as shown in FIG. 3. The wedges are designed to extend longitudinally between gaps 16 to position the magnet segments 14 radially against the inner surface of the shell and, as shown in FIG. 1, the wedge members on cap 22 also position the magnet segments longitudinally in the opposite direction from stops 18. When the end caps are formed of a suitable non-magnetic metal or plastic material, such as a phenolic, the wedge members 28 may be easily formed preferably as an integral part of the cap, although they could be separate members attached to the caps. As shown in FIG. 1, extensions 30 on end cap 20 are for connection with a mechanism operated by the motor and are not part of the present invention as shown but can also be an integral part of the caps.

In order to provide suitable positioning of the magnets within shell 10, the caps may be provided with oppositely disposed projections 32 to engage cooperating recesses 34 on the shell and position the shell and end caps together, thus positioning the magnets 14 in one simple assembly operation.

Conveniently, the end caps 20 and 22 are secured together by bolt means 36 that extend longitudinally through the wedge members 32, gaps 16, and into the opposite end cap for fastening in any suitable manner.

Thus, the field structure construction permits magnets 14 to be magnetized separately before assembly, inserted into the field shell 10 against stops 18, and the non-magnetic caps 20 and 22 are then inserted whereby wedge members 28 properly position and hold magnets 14 in the field. The entire structure is then peripherally located by projections 32 and recesses 34 and secured together by bolts 36 in an easy assembly operation for simple axially and radially locating the magnets by the wedging action at both ends of the magnets.

While there has been described a preferred form of the invention, obvious equivalent variations are possible in light of the above teachings. It is therefore to be understood that, within the scope of the appended claims, the invention may be practiced otherwise than as specifically described and the claims are intended to cover such equivalent variations.

We claim:
1. A permanent magnet motor comprising:
   a cylindrical magnetic field shell;
   an armature disposed to rotate about a longitudinal axis within said shell;
   plural cylindrical magnet segments disposed around the inner periphery of said shell and around the armature;
   stop means on said shell extending inwardly thereof to position said segments longitudinally;
   end caps fastened on each end of said shell;
   wedge members on said caps tapered and extending longitudinally therefrom within said shell;
   said members engaging said segments to position said segments radially against the inner surface of the shell and longitudinally thereof.
2. Apparatus as described in claim 1 wherein said end caps support each end of said armature, and said wedge members are integrally formed on said caps.
3. Apparatus as described in claim 1 where said magnets comprise a pair peripherally spaced in said shell to provide a gap between adjacent edges, and said wedge members are disposed to enter said gaps at each end thereof.
4. Apparatus as described in claim 3 wherein said end caps support each end of said armature, and
   said wedge members are integrally formed on said caps;
   said caps having projections thereon engaging said shell and peripherally locating said caps with respect to said shell.
5. Apparatus as described in claim 3 where said stop means comprises punched-in portions on said shell.

6. A permanent magnet fractional horsepower motor comprising:
   a thin cylindrical magnetic field shell;
   a segmented armature disposed to rotate about a longitudinal axis within said shell;
   a pair of cylindrical magnet segments oppositely disposed on the inner shell periphery;
   said segments having longitudinal gaps between adjacent edges;
   a pair of oppositely disposed punched-in portions on said shell substantially at one end thereof forming stop means to limit longitudinal movement of each magnet in one direction;
   an end cap having a portion nesting within the shell at each end thereof;
   wedge members on said nesting portion of said caps extending longitudinally within said shell between said gaps and engaging said segments to position said segments radially against the inner surface of said shell and longitudinally in the other direction.
7. Apparatus as described in claim 6 wherein said end caps support each end of said armature, and said wedge members are integrally formed on said caps.
8. Apparatus as described in claim 6 having bolt means extending longitudinally through said wedge members, gaps, and secured at each end to said caps.
9. Apparatus as described in claim 8 wherein said end caps support each end of said armature, and
   said wedge members are integrally formed on said caps;
   said caps having projections thereon engaging said shell and peripherally locating said caps with respect to said shell.

References Cited

UNITED STATES PATENTS

| | | | |
|---|---|---|---|
| 2,465,446 | 3/1949 | Gorfin. | |
| 2,935,785 | 5/1960 | Stein | 310—154 |
| 3,076,905 | 2/1963 | Watson | 310—46 |
| 3,083,310 | 3/1963 | Tweedy | 310—154 |
| 3,165,654 | 1/1965 | Mabuchi | 310—46 |

MILTON O. HIRSHFIELD, Primary Examiner

R. SKUDY, Assistant Examiner

U.S. Cl. X.R.

310—258